Dec. 18, 1945. L. B. HELLER 2,391,310
AUTOMOBILE TRUNK LOADING DEVICE
Filed March 7, 1945 2 Sheets-Sheet 1
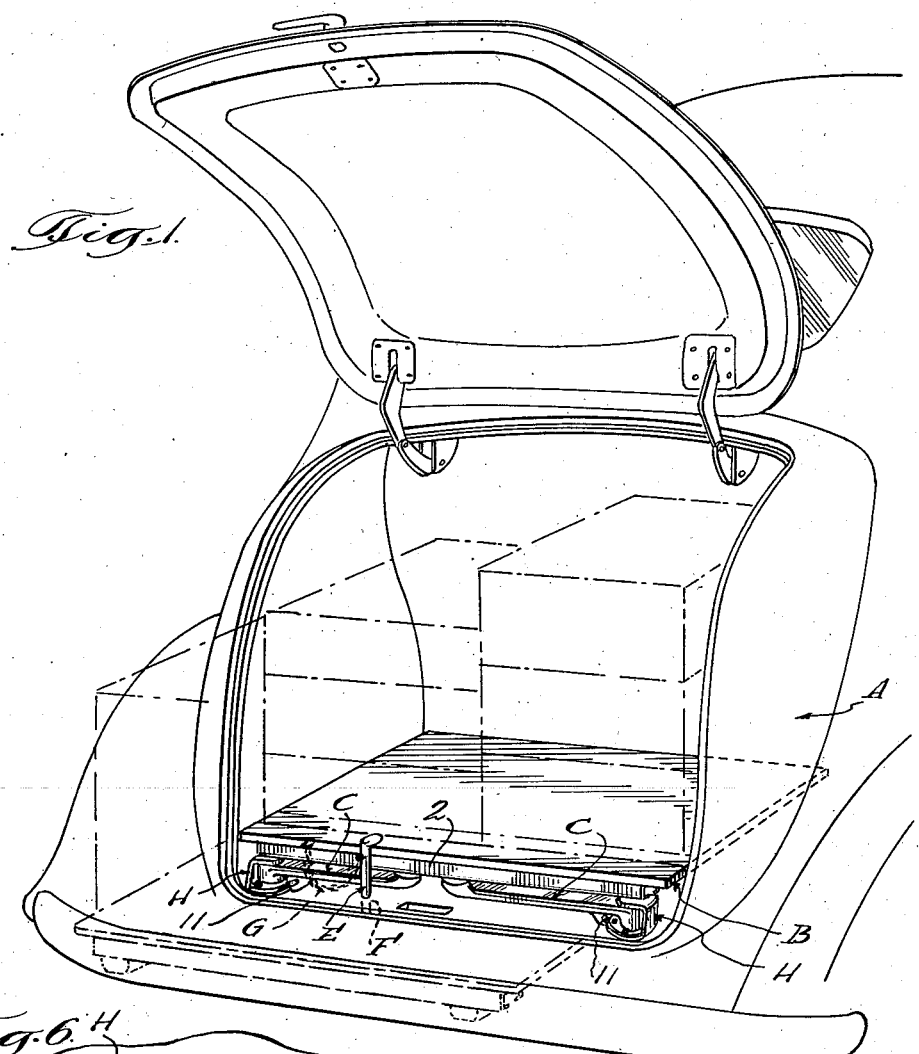
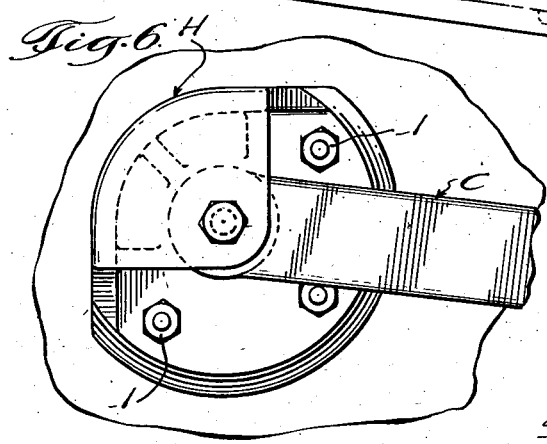
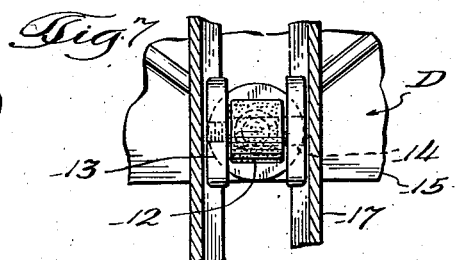
Inventor
Leo B. Heller
By Earl Freeman
attorney

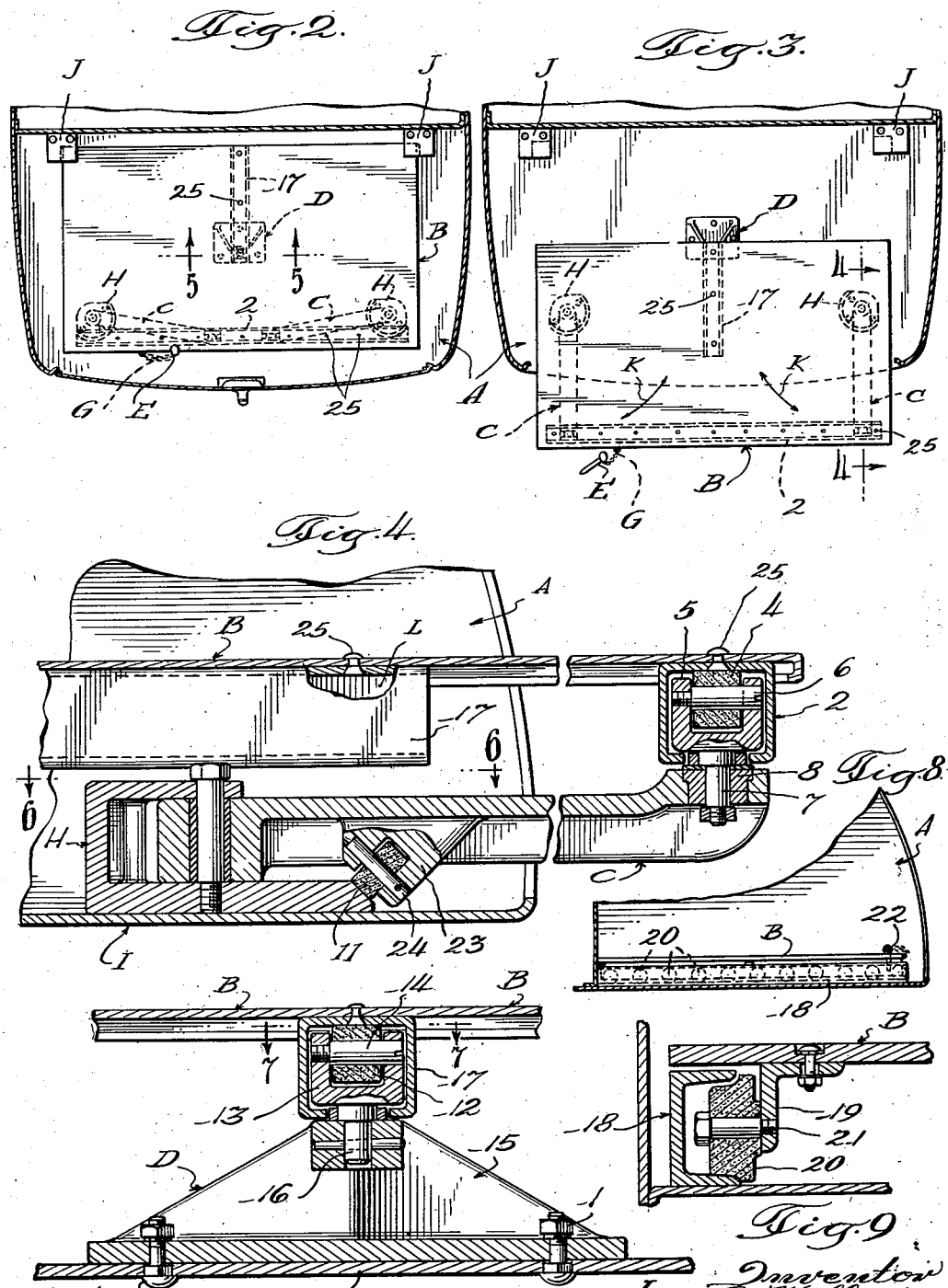

Patented Dec. 18, 1945

2,391,310

UNITED STATES PATENT OFFICE 2,391,310

AUTOMOBILE TRUNK LOADING DEVICE

Leo B. Heller, Chicago, Ill.

Application March 7, 1945, Serial No. 581,470

3 Claims. (Cl. 214—65)

This invention relates generally to a movable platform to facilitate the loading and unloading of objects thereon and refers more particularly to a sliding platform enclosed in the rear of a passenger automobile.

The loading and unloading of baggage and other objects in the rear compartment of an automobile is difficult and cumbersome because the furthermost portions of the compartment are not readily accessible to the operator. This latter factor restricts the efficient and complete utilization of the storage space available in the compartment.

The primary object of the present invention is to obviate the difficulties just mentioned by providing a slidable platform in the compartment, having means to support the platform in an extended position, thereby facilitating the loading and removal of objects therefrom.

One advantage of my invention is to accomplish the loading and unloading of objects in and from the automobile compartment with ease and a minimum of effort by the operator. Another advantage of my invention is to permit the removal of an object stored in the innermost recesses of the trunk without requiring the unloading of other objects in the forepart of the trunk. A further advantage secured by my invention is that it effects the more efficient utilization of the storage space available in the trunk.

Fig. 1 is a perspective view of a rear trunk of a passenger automobile showing the position of the entire movable platform contained therein.

Fig. 2 is a diagrammatic plan view of the entire platform in the retracted position.

Fig. 3 is a diagrammatic plan view of the entire platform in the extended position.

Fig. 4 is a sectional view taken as indicated on line 4—4 of Fig. 3.

Fig. 5 is a sectional view taken as indicated on line 5—5 of Fig. 3.

Fig. 6 is a plan view taken on line 6—6 of Fig. 4.

Fig. 7 is a plan sectional view taken on line 7—7 of Fig. 5.

Figures 8 and 9 represent another method for extending and retracting the platform.

In the figures on sheets 1 and 2 identical letters and numerals indicate like parts.

The rear trunk of a passenger automobile A in Fig. 1 has enclosed a movable platform B supported at three points by two pivotally mounted sliding arms C and a central support D not shown in Fig. 1 but illustrated in Figures 2 and 3. Attached to the under side of platform B are two channel tracks designated by numerals 2 and 17. Track 2 is positioned adjacent and parallel to the front edge of platform B and track 17 is centrally located at right angles to track 2. Sliding arms C are pivotally supported and attached to the base of the compartment by bearing H. At the other end of arms C are roller sliding means engaged in track 2 as shown in detail in Fig. 4. A rigid arm D (Fig. 5) attached to the base of the compartment supports a sliding means engaged in track 17.

When the platform B, Fig. 2, is pulled out from trunk A the sliding means at the ends of arms C roll in track 2 outwardly until the platform is in an extended position, Fig. 3. During this operation the ends of arms C pivotally attached to the sliding means follow a path described by two arcs indicated by arrows K. The other ends of arms C are supported by and pivot in bearings H. As platform B moves forward, it is supported horizontally by a roller attached to arm D and engaged in track 17 which track of course moves with platform B, while arm D remains stationary. Track 17 and roller and arm D also act as a guide for platform B preventing side motion and permitting only forward and rearward movement.

From the foregoing description, it will be seen that platform B when in retracted position or when partially or wholly extended is always supported at three spaced points by arms C and rigid arm D.

When the platform is in retracted position it may be secured by placing pin E in slot F. Pin E is attached to platform B by means of chain G. Back stops J are provided to prevent lateral thrust of platform B, which may occur when the automobile is in motion.

Fig. 4 is a detailed section of sliding arm C mounted on bearing H which is fastened to the bottom of trunk I by bolts 1 (Fig. 6). At the other ends of arms C are sliding means engaged in channel track 2 which latter rests on roller supported by pin 6 fastened in guide 5.

Extending from guide 5 is arm 7 which is pivotally attached to arm C by means of bushing 8. Suitable sliding means other than the roller just described may be employed, as for example, sliding means of the ball bearing type.

To provide additional support for arm C an extension 23 attached at a point intermediate the length of arm C has incorporated pin 24 on which revolves roller 11. The bottom edge of bearing H is bevelled as shown to provide a supporting means for roller 11. As an alternative method, not shown in the drawings, roller 11 may rest directly on the base 1 of the compartment.

A section of channel track 2 is illustrated in Fig. 4 and designated L. Track 2 is secured to the bottom of platform B by rivets 25. The rivets 25 should be flush with the inner surface of track 2 to prevent any obstruction to rollers 4.

Fig. 5 illustrates center support D and roller 12 upon which platform B slides when it is extended or retracted. Roller 12 revolves around pin 14 inserted in bearing 13. Bearing 13 is attached to base 15 of center support D by means of extension 16. Track 17 is attached to underside of platform B to maintain a true course when the platform is in forward or rearward motion. Fig. 7 is a plan section of center support D with roller 12, bearing 13, and track 17.

Another embodiment of my invention is illustrated in Figures 8 and 9. This is accomplished by sliding platform B by means of a series of flanged rollers 20 rolling on channel shaped tracks 18 connected to floor of trunk. Flanged rollers 20 are attached to angle iron 19 by means of pins 21. Holes are provided in top flange of track 18 and at ends of platform B into which a stop pin 22, attached to platform B by means of a chain may be inserted.

While I have shown and described a few embodiments of my invention, this is illustrative only and in no way limits the scope of my invention. My invention is limited solely by and in the following claims, in which I wish to claim all novel features inherent therein.

I claim:

1. The improvement in a luggage compartment which comprises a slidable platform mounted within said compartment and provided with a channel track attached to the under side of said platform adjacent and parallel to the front edge of said platform, said platform supported on rollers engaged within said track, each slidably mounted on an arm supported by a roller contacting the base of said compartment, each of said arms pivotally supported and attached to the base of said compartment adjacent right and left edges respectively of said base to permit forward and rearward motion of said platform, said platform supported horizontally by a roller engaged within a channel track attached to the under side of said platform at right angles to the first mentioned track, said roller being supported by a rigid arm attached to the base of said compartment.

2. The improvement in a storage compartment which comprises a slidable platform mounted within said compartment and provided with a channel track attached to the under side of said platform adjacent and parallel to the front edge of said platform, said platform supported by slidable means engaged within said track, each slidably mounted on an arm supported by means slidably contacting the base of said compartment, each of said arms pivotally supported and attached to the base of said compartment adjacent right and left edges respectively of said base to permit forward and rearward motion of said platform, said platform supported horizontally by slidable means engaged within a channel track attached to the under side of said platform at right angles to the first mentioned track, said slidable means being supported by a rigid arm attached to the base of said compartment.

3. The improvement in a luggage compartment which comprises a slidable platform mounted within said compartment and provided with a channel track attached to the under side of said platform adjacent and parallel to the front edge of said platform, said platform supported by rotatable means engaged within said track, each slidably mounted on an arm supported by means slidably contacting the base of said compartment, each of said arms pivotally supported and attached to the base of said compartment adjacent right and left edges respectively of said base to permit forward and rearward motion of said platform, said platform supported horizontally by rotatable means engaged within a channel track attached to the under side of said platform at right angles to the first mentioned track, said rotatable means being supported by a rigid arm attached to the base of said compartment.

LEO B. HELLER.